US009661798B2

(12) United States Patent
Sudbrink et al.

(10) Patent No.: US 9,661,798 B2
(45) Date of Patent: May 30, 2017

(54) AGRICULTURAL TILLAGE IMPLEMENT WHEEL CONTROL

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 62 days.

(21) Appl. No.: 14/532,099

(22) Filed: Nov. 4, 2014

(65) Prior Publication Data

US 2015/0129251 A1    May 14, 2015

Related U.S. Application Data

(60) Provisional application No. 61/903,519, filed on Nov. 13, 2013.

(51) Int. Cl.
    A01B 63/16    (2006.01)
    A01B 63/22    (2006.01)
    A01B 73/04    (2006.01)

(52) U.S. Cl.
    CPC ............ *A01B 63/22* (2013.01); *A01B 73/046* (2013.01)

(58) Field of Classification Search
    USPC .............................. 172/459, 668, 675, 799.5
    IPC .................... A01B 63/16,63/22, 73/04, 73/044, A01B 73/048
    See application file for complete search history.

(56) References Cited

U.S. PATENT DOCUMENTS

| 3,700,041 A | 10/1972 | Ryan |
| 3,908,345 A | 9/1975 | Oni et al. |
| 4,026,365 A | 5/1977 | Andersson et al. |
| 4,119,329 A | 10/1978 | Smith |
| 4,176,721 A | 12/1979 | Poggemiller et al. |

(Continued)

FOREIGN PATENT DOCUMENTS

| CA | 2 289 240 A1 | 5/2000 |
| FR | 2 651 957 A1 | 3/1991 |

(Continued)

OTHER PUBLICATIONS

"Electro-hydraulic tillage depth control system for rotary implements mounted on agricultural tractor Design and response experiments of control system", Jeyong Lee, M. Yamazaki, A. Oida, H. Nakashima, H. Shimizu, Journal of Terramechanics 35, 1998, pp. 229-238 (10 pages).

*Primary Examiner* — Gary Hartmann
(74) *Attorney, Agent, or Firm* — Rebecca L. Henkel; Rickard K. DeMille

(57) ABSTRACT

An agricultural tillage implement including a main section having a hitch extending in a travel direction, a plurality of foldable wing sections coupled with the main section, and a plurality of ground engaging tilling elements. The tilling elements are coupled to the main section and wing sections. At least one of the sections have a gauge wheel system. The gauge wheel system includes an untilled wheel assembly, a tilled wheel assembly, and an adjustment device. The adjustment device is configured to adjust the untilled wheel assembly relative to the tilled wheel assembly thereby compensating for a characteristic difference between tilled and untilled soil.

14 Claims, 10 Drawing Sheets

(56) References Cited

U.S. PATENT DOCUMENTS

| | | | |
|---|---|---|---|
| 4,273,196 A | 6/1981 | Etsusaki et al. | |
| 4,301,871 A | 11/1981 | van der Lely et al. | |
| 4,317,489 A | 3/1982 | Steinbach | |
| 4,355,688 A | 10/1982 | Hamm et al. | |
| 4,359,105 A | 11/1982 | Van Natta | |
| 4,479,549 A * | 10/1984 | Fegley | A01B 73/044 172/142 |
| 4,600,060 A | 7/1986 | Winter et al. | |
| 4,878,543 A | 11/1989 | Kauss | |
| 4,944,355 A | 7/1990 | Karchewski | |
| 5,009,270 A | 4/1991 | Vangsgard | |
| 5,234,060 A | 8/1993 | Carter | |
| 5,409,069 A * | 4/1995 | Hake | A01B 63/22 172/328 |
| 5,427,184 A | 6/1995 | Peck | |
| 5,538,266 A | 7/1996 | Martin et al. | |
| 5,562,167 A | 10/1996 | Honey | |
| 5,573,072 A | 11/1996 | Evans et al. | |
| 5,660,237 A | 8/1997 | Boyko et al. | |
| 5,771,978 A | 6/1998 | Davidson et al. | |
| 5,957,218 A | 9/1999 | Noonan et al. | |
| 6,068,062 A * | 5/2000 | Brueggen | A01B 73/044 172/311 |
| 6,089,327 A | 7/2000 | Kimura et al. | |
| 6,112,145 A | 8/2000 | Zachman | |
| 6,112,827 A | 9/2000 | Reiber et al. | |
| 6,144,910 A | 11/2000 | Scarlett et al. | |
| 6,220,366 B1 | 4/2001 | Noonan et al. | |
| 6,302,220 B1 * | 10/2001 | Mayerle | A01B 63/32 172/459 |
| 6,305,478 B1 | 10/2001 | Friggstad | |
| 6,315,055 B1 * | 11/2001 | Friggstad | A01B 73/02 172/459 |
| 6,367,589 B1 | 4/2002 | Lausch et al. | |
| 6,374,921 B1 | 4/2002 | Friggstad | |
| 6,378,619 B2 * | 4/2002 | Mayerle | A01B 63/32 172/2 |
| 6,397,953 B1 * | 6/2002 | Ankenman | A01B 51/04 172/445.1 |
| 6,547,012 B2 | 4/2003 | Scarlett et al. | |
| 6,786,130 B2 | 9/2004 | Steinlage et al. | |
| 6,935,253 B2 | 8/2005 | Murray et al. | |
| 7,142,956 B2 | 11/2006 | Heiniger et al. | |
| 7,588,088 B2 | 9/2009 | Zachman | |
| 7,640,874 B2 * | 1/2010 | Hoehn | A01B 49/06 111/66 |
| 7,766,093 B2 | 8/2010 | Becker et al. | |
| 7,970,519 B2 | 6/2011 | Green | |
| 8,141,653 B2 * | 3/2012 | Ryder | A01B 73/067 172/311 |
| 8,176,992 B2 * | 5/2012 | Yuen | A01B 73/048 172/311 |
| 8,215,413 B2 * | 7/2012 | Friggstad | A01B 73/067 172/311 |
| 8,235,133 B2 | 8/2012 | Friggstad | |
| 8,291,997 B2 * | 10/2012 | Kovach | A01B 21/08 172/395 |
| 8,336,639 B2 * | 12/2012 | Palen | A01B 63/22 172/328 |
| 8,352,121 B2 | 1/2013 | Bitter | |
| 8,359,988 B2 | 1/2013 | Bassett | |
| 8,567,517 B2 * | 10/2013 | Friggstad | A01B 63/32 172/140 |
| 8,636,078 B2 * | 1/2014 | Yuen | A01B 73/048 172/311 |
| 8,763,717 B2 * | 7/2014 | Kovach | A01B 21/08 172/395 |
| 9,148,987 B2 * | 10/2015 | Baker | A01B 51/04 |
| 9,253,937 B2 * | 2/2016 | Horsch | A01B 49/027 |
| 9,301,439 B2 * | 4/2016 | Gilstring | A01B 49/027 |
| 9,439,340 B2 * | 9/2016 | Sudbrink | A01B 59/042 |
| 2001/0001988 A1 | 5/2001 | Friggstad | A01B 59/042 172/310 |
| 2004/0016556 A1 | 1/2004 | Barber | |
| 2006/0021235 A1 | 2/2006 | Becker | |
| 2007/0068238 A1 | 3/2007 | Wendte | |
| 2008/0110649 A1 * | 5/2008 | Connell | A01B 63/22 172/317 |
| 2008/0267719 A1 | 10/2008 | Corcoran | |
| 2011/0284253 A1 * | 11/2011 | Stevenson | A01B 49/027 172/311 |
| 2012/0048159 A1 | 3/2012 | Adams et al. | |
| 2012/0048160 A1 | 3/2012 | Adams et al. | |
| 2012/0215410 A1 | 8/2012 | McClure et al. | |
| 2012/0227992 A1 | 9/2012 | Henry | |
| 2012/0261146 A1 | 10/2012 | Bolten | |
| 2012/0305321 A1 | 12/2012 | Wagger | |
| 2013/0032363 A1 | 2/2013 | Curry et al. | |
| 2014/0262370 A1 * | 9/2014 | Kohn | A01B 49/027 172/140 |
| 2015/0053439 A1 * | 2/2015 | Ohnsat | A01B 63/22 172/315 |
| 2015/0053440 A1 * | 2/2015 | Ohnsat | A01B 63/22 172/421 |
| 2015/0068779 A1 * | 3/2015 | Naylor | A01B 73/046 172/1 |
| 2015/0129249 A1 * | 5/2015 | Sudbrink | A01B 73/046 172/1 |
| 2015/0129250 A1 * | 5/2015 | Sudbrink | A01B 73/046 172/1 |
| 2015/0129252 A1 * | 5/2015 | Sudbrink | A01B 73/046 172/1 |
| 2015/0129253 A1 * | 5/2015 | Sudbrink | A01B 73/046 172/1 |
| 2015/0129254 A1 * | 5/2015 | Sudbrink | A01B 3/26 172/1 |
| 2015/0129255 A1 * | 5/2015 | Sudbrink | A01B 3/26 172/2 |
| 2015/0129259 A1 * | 5/2015 | Sudbrink | A01B 63/22 172/407 |
| 2015/0129263 A1 * | 5/2015 | Sudbrink | A01B 73/046 172/663 |
| 2015/0129264 A1 * | 5/2015 | Sudbrink | A01B 73/046 172/668 |
| 2015/0156944 A1 * | 6/2015 | Zemenchik | A01B 73/065 172/1 |
| 2015/0156945 A1 * | 6/2015 | Sudbrink | A01B 63/14 172/1 |
| 2015/0156946 A1 * | 6/2015 | Sudbrink | A01B 63/14 172/1 |
| 2015/0156947 A1 * | 6/2015 | Sudbrink | A01B 63/22 172/421 |
| 2015/0156955 A1 * | 6/2015 | Sudbrink | A01B 73/065 172/1 |
| 2015/0156956 A1 * | 6/2015 | Sudbrink | A01B 73/065 172/669 |
| 2015/0156957 A1 * | 6/2015 | Sudbrink | A01B 73/065 172/1 |
| 2015/0156958 A1 * | 6/2015 | Sudbrink | A01B 73/065 172/669 |
| 2015/0156959 A1 * | 6/2015 | Sudbrink | A01B 73/065 172/1 |
| 2015/0156960 A1 * | 6/2015 | Sudbrink | A01B 73/065 172/552 |
| 2015/0156961 A1 * | 6/2015 | Sudbrink | A01B 73/065 172/1 |
| 2016/0205862 A1 * | 7/2016 | Sudbrink | A01B 63/22 |
| 2016/0212927 A1 * | 7/2016 | Sudbrink | A01B 63/32 |
| 2016/0212928 A1 * | 7/2016 | Wileniec | A01B 73/046 |
| 2016/0212929 A1 * | 7/2016 | Wileniec | A01B 63/22 |
| 2016/0249521 A1 * | 9/2016 | Sudbrink | A01B 63/22 |

FOREIGN PATENT DOCUMENTS

| | | |
|---|---|---|
| GB | 833670 | 4/1960 |
| JP | 3087102 A | 4/1991 |
| JP | 9313010 A | 12/1997 |

(56) References Cited

FOREIGN PATENT DOCUMENTS

| | | |
|---|---|---|
| JP | 2000-270603 A | 10/2000 |
| WO | 03/000028 A1 | 1/2003 |
| WO | 2013/026661 A1 | 2/2013 |

* cited by examiner

AGRICULTURAL TILLAGE IMPLEMENT WHEEL CONTROL

CROSS REFERENCE TO RELATED APPLICATIONS

This is a non-provisional application based upon U.S. provisional patent application Ser. No. 61/903,519, entitled "AGRICULTURAL TILLAGE IMPLEMENT WHEEL CONTROL", filed Nov. 13, 2013, which is incorporated herein by reference.

BACKGROUND OF THE INVENTION

1. Field of the Invention

The present invention relates to agricultural implements, and, more particularly, to agricultural tillage implements having wheels.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

Tillage equipment prepares the soil by way of mechanical agitation of various types, such as digging, stirring, and overturning. Examples of which include plowing (overturning with moldboards or chiseling with chisel shanks), rototilling, rolling with cultipackers or other rollers, harrowing, and cultivating with cultivator shanks.

Tillage is often classified into two types, primary and secondary. There is no strict definition of these two types, perhaps a loose distinction between the two is that tillage that is deeper and more thorough is thought of as primary, and tillage that is shallower is thought of as secondary. Primary tillage such as plowing produces a larger subsurface difference and tends to produce a rough surface finish, whereas secondary tillage tends to produce a smoother surface finish, such as that required to make a good seedbed for many crops. Harrowing and rototilling often combine primary and secondary tillage into one operation.

Wheels are often integral with tillage implements and are used for both transportation of the implement, and for depth control of the tillage elements. The prior art includes control systems that raise and lower the implement as an entire unit, which can result in uneven tillage across the implement width of today's wider equipment.

What is needed in the art is an easy to use mechanism for adjusting the wheel positions of an agricultural tillage implement.

SUMMARY OF THE INVENTION

The present invention provides a tillage implement that has several tilling sections with the ability to independently adjust the fore/aft orientation to level the various sections of the tillage implement.

The invention in one form is directed to an agricultural tillage implement including a main section having a hitch extending in a travel direction, a plurality of foldable wing sections coupled with the main section, and a plurality of ground engaging tilling elements. The tilling elements are coupled to the main section and wing sections. At least one of the sections have a gauge wheel system. The gauge wheel system includes an untilled wheel assembly, a tilled wheel assembly, and an adjustment device. The adjustment device is configured to adjust the untilled wheel assembly relative to the tilled wheel assembly thereby compensating for a characteristic difference between tilled and untilled soil.

The invention in another form is directed to a gauge wheel system of an agricultural tillage implement having a main section having a hitch extending in a travel direction, a plurality of foldable wing sections coupled with the main section, and a plurality of ground engaging tilling elements. The tilling elements are coupled to the main section and wing sections. The sections each use at least one of the gauge wheel systems. The gauge wheel system includes an untilled wheel assembly, a tilled wheel assembly, and an adjustment device. The adjustment device is configured to adjust the untilled wheel assembly relative to the tilled wheel assembly thereby compensating for a characteristic difference between tilled and untilled soil.

The invention in yet another form is directed to a method of adjusting a fore/aft orientation of an agricultural implement, the method comprising the step of independently adjusting a plurality of adjustment devices to control a relative extension of a plurality of untilled gauge wheels relative to a plurality of tilled gauge wheels of the implement.

An advantage of the present invention is that the implement is adjustable in a fore/aft manner to level the tilling elements.

Another advantage of the present invention is that the actuators are used to raise and lower the implement using the adjustable link as part of the link to the front set of gauge wheels.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
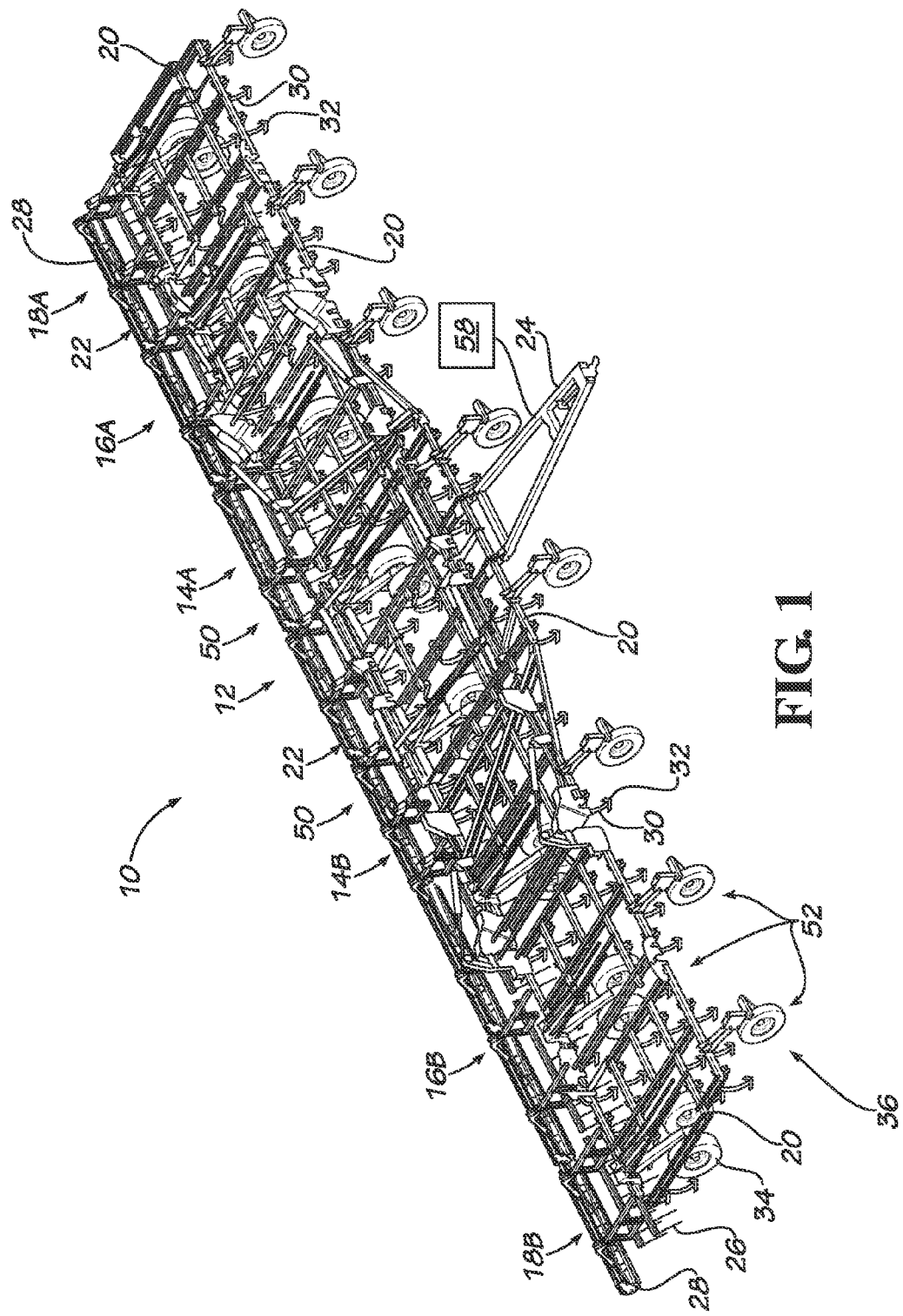
FIG. 1 is a top perspective view of an embodiment of an agricultural tillage implement of the present invention, in the form of a field cultivator, in an unfolded position.

Referring now to the drawings, and more particularly to FIG. 1, there is shown an embodiment of a tillage implement of the present invention. In the illustrated embodiment, the tillage implement is in the form of a field cultivator 10 for tilling and finishing soil prior to seeding.

Field cultivator 10 is configured as a multi-section field cultivator, and includes a center frame section 12, also referred herein as a main section 12, and a plurality of wing sections 14, 16 and 18. In the illustrated embodiment, field cultivator 10 has a triple-fold configuration with three left wings sections designated 14A, 16A and 18A, and three right wing sections designated 14B, 16B and 18B. Wing sections 14A and 14B are each inner wing sections, wing sections 16A and 16B are each middle wing sections, and wing sections 18A and 18B are each outer wing sections.

Center frame section 12 is the center section that is directly towed by a traction unit, such as an agricultural tractor (not shown). Center frame section 12 generally functions to carry a shank frame 20 for tilling the soil, and a rear auxiliary implement 22 for finishing the soil. A pull hitch 24 extends forward from shank frame 20, and is coupled with the traction unit in known manner.

Rear auxiliary implement 22 includes a spring tooth drag 26 and a rolling (aka, crumbler) basket 28 which coact with each other to finish the soil. However, rear auxiliary implement 22 can be differently configured, such as a spike tooth drag, cultivator shanks, etc.

Figure 2:
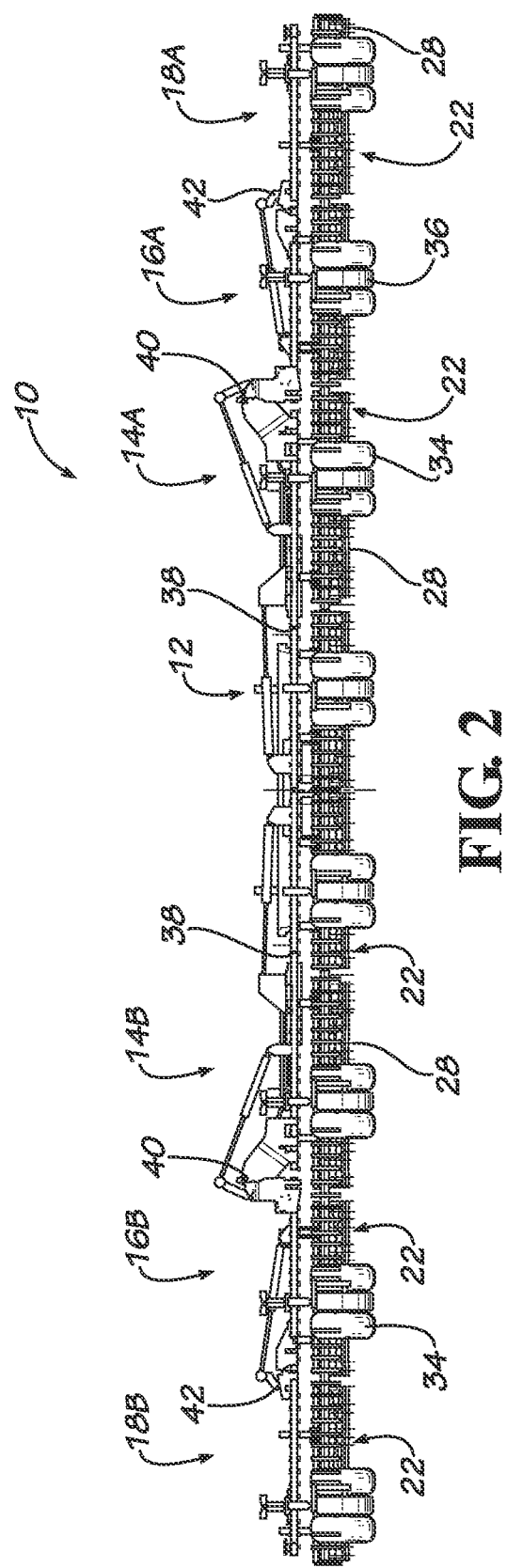
FIG. 2 is a front view of the field cultivator shown in FIG. 1.

Shank frame 20 generally functions to carry cultivator shanks 30 with shovels 32 at their lower ends for tilling the soil. Rear lift wheels 34 are used for raising and lowering the shank frame 20 with a hydraulic lift cylinder (not specifically visible in FIGS. 1 and 2), and a pair of front gauge wheels 36 are used to control the fore/aft orientation of the shank frame 20 during a field operation.

Similarly, each inner wing section 14A and 14B, middle wing section 16A and 16B, and outer wing section 18A and 18B includes a shank frame 20 for tilling the soil, a rear auxiliary implement 22 for finishing the soil, rear lift wheels 34 and front gauge wheels 36. These components are slightly different from but still similar to the like-named components described above with regard to center frame section 12, and are not described in further detail herein.

Figure 3:
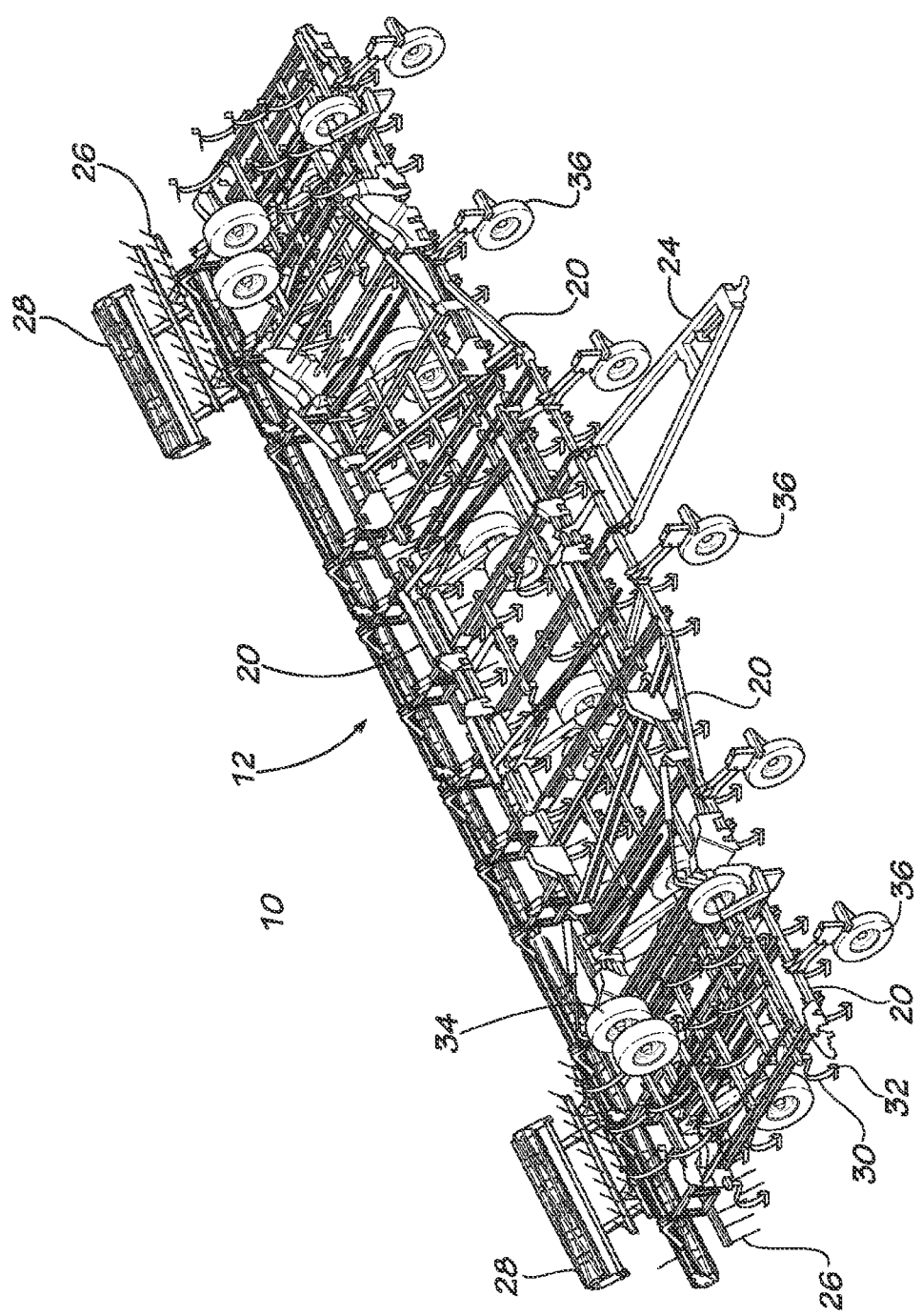
FIG. 3 is a top perspective view of the field cultivator shown in FIGS. 1-2, with the outer wing sections folded to a transport position.
Figure 4:
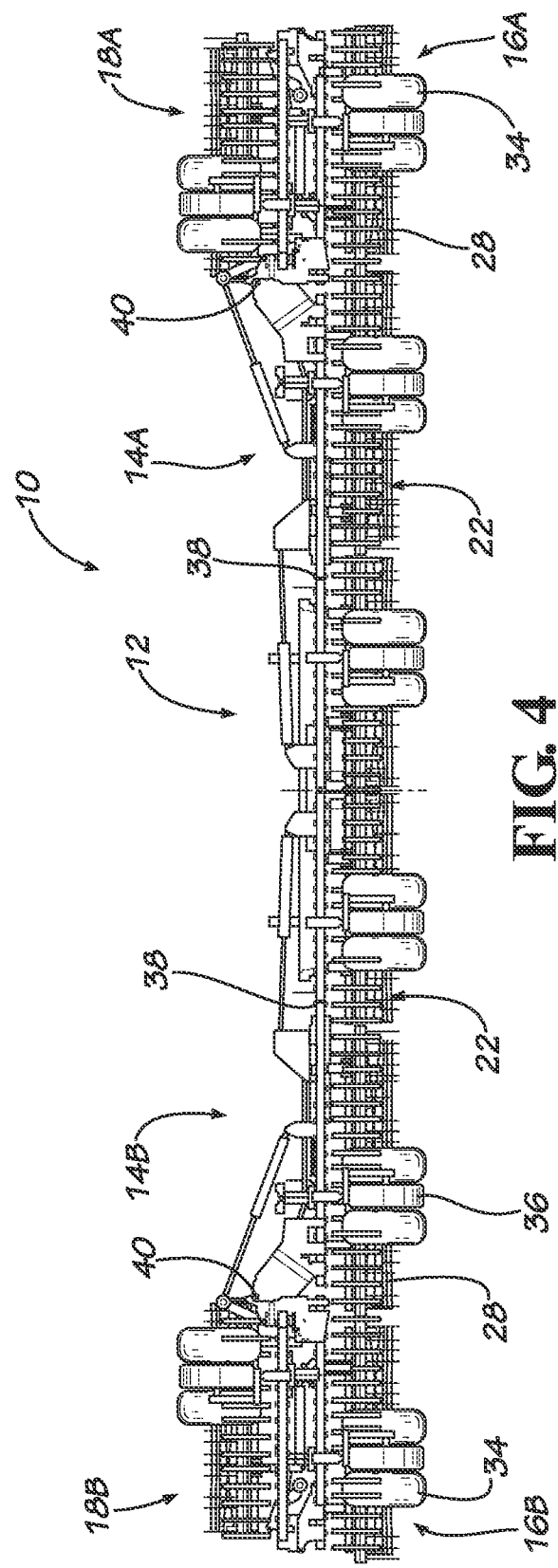
FIG. 4 is a front view of the field cultivator shown in FIG. 3, with the outer wing sections folded to the transport position.
Figure 5:
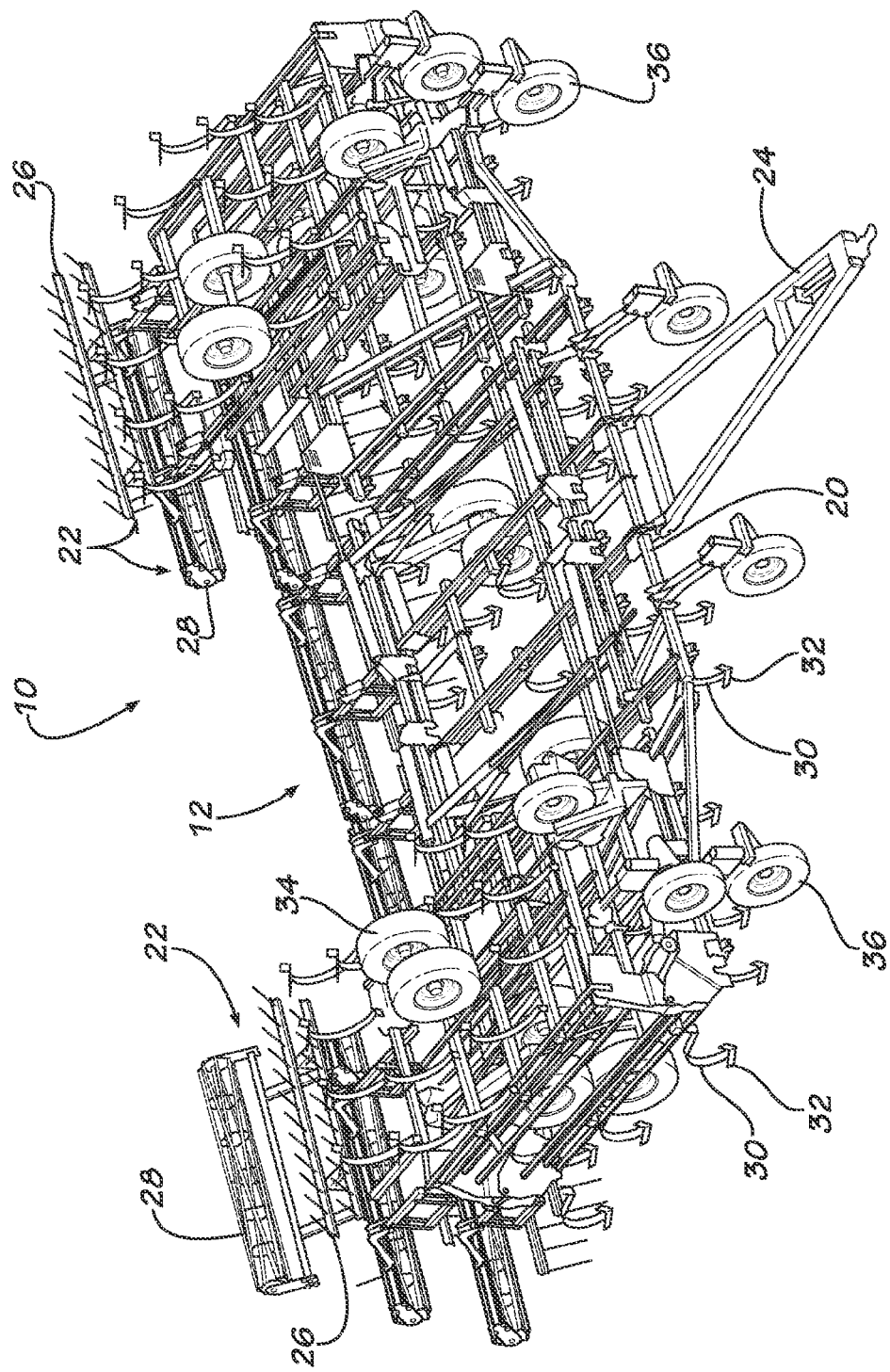
FIG. 5 is a top perspective view of the field cultivator shown in FIGS. 1-4, with the middle wing sections folded to a transport position.
Figure 6:
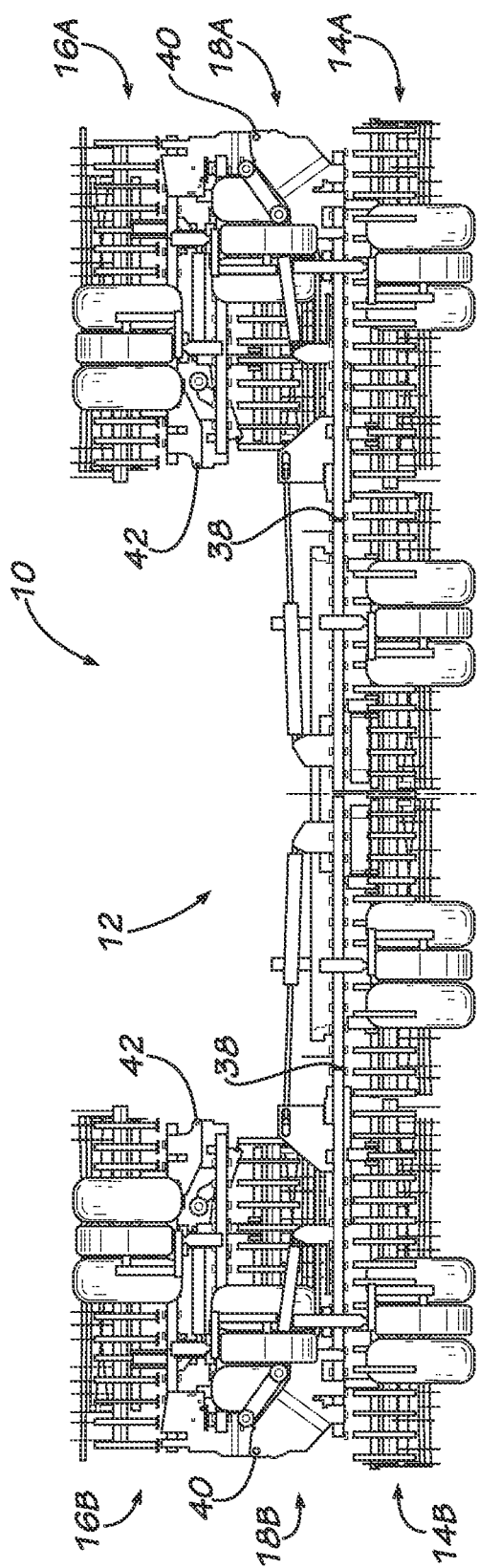
FIG. 6 is a front view of the field cultivator shown in FIG. 5, with the middle wing sections folded to the transport position.
Figure 7:
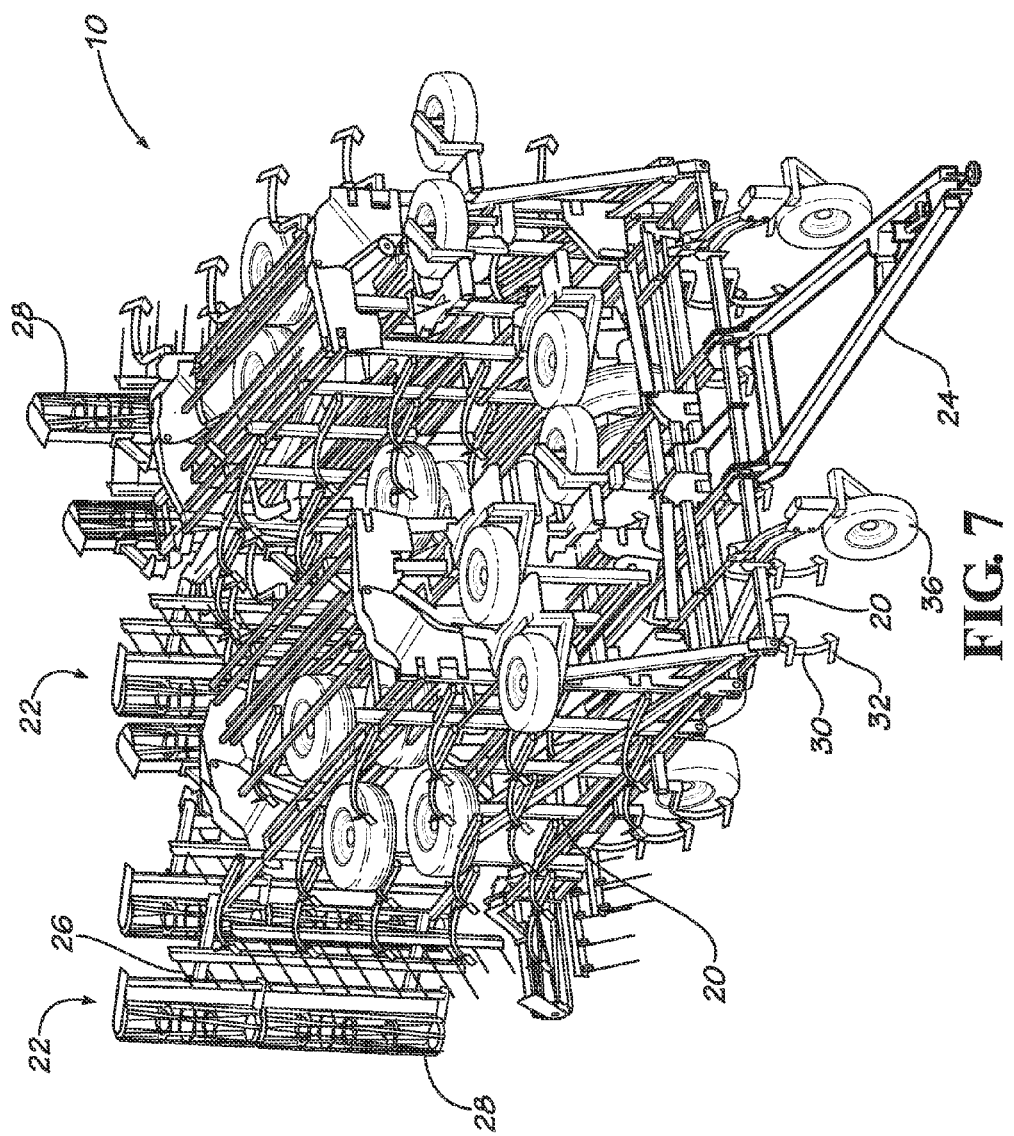
FIG. 7 is a top perspective view of the field cultivator shown in FIGS. 1-6, with the inner wing sections folded to a transport position.
Figure 8:
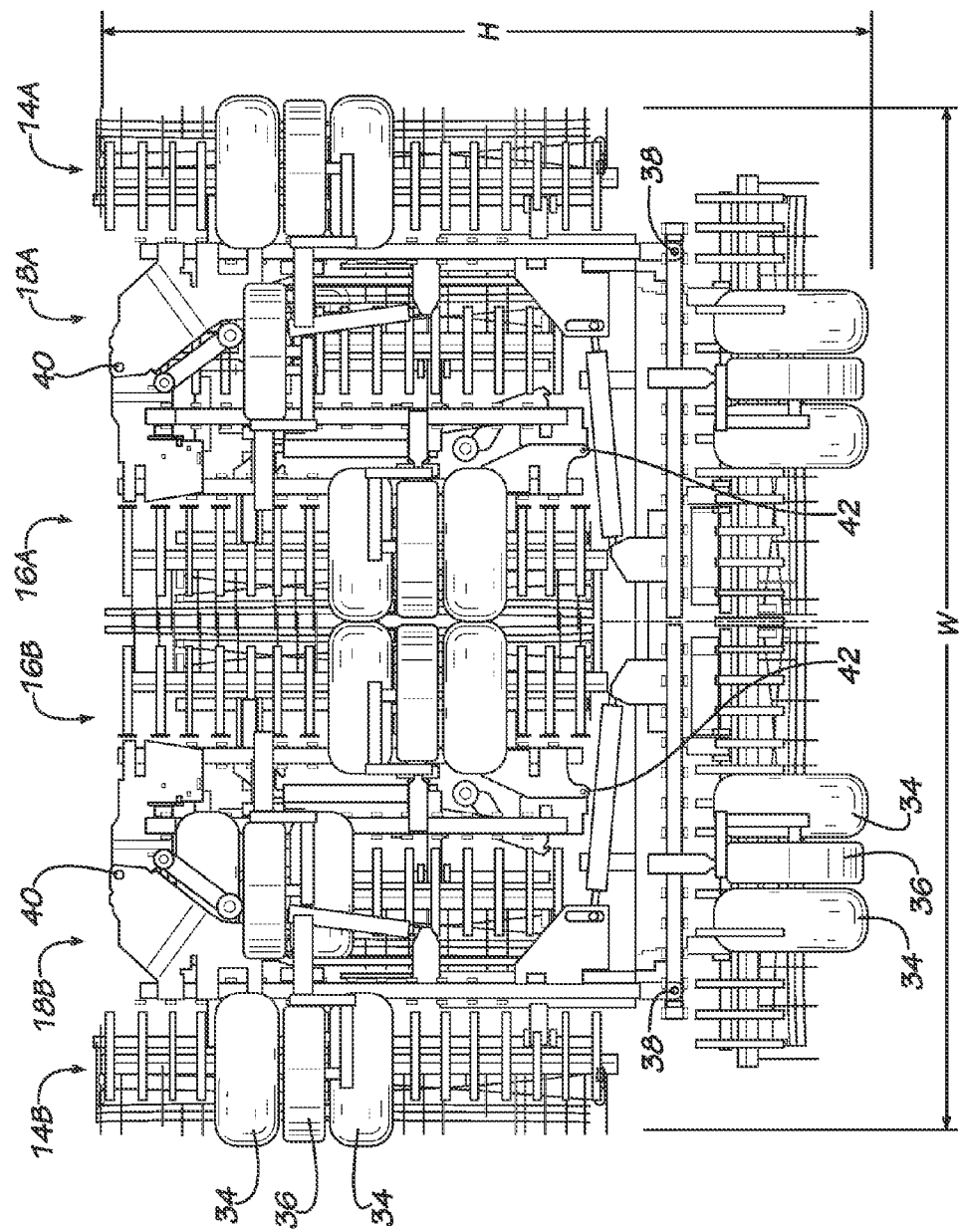
FIG. 8 is a front view of the field cultivator shown in FIG. 7, with the inner wing sections folded to the transport position.

During use, it is periodically necessary to move the field cultivator 10 from an unfolded (operating) position to a folded (transport) position. First, each outer wing section 18A and 18B is folded laterally inward and over a respective middle wing section 16A and 16B (FIGS. 3 and 4). With the outer wing sections 18A and 18B in the folded state, each middle wing section 16A and 16B is then folded laterally inward and over a respective inner wing section 14A and 14B (FIGS. 5 and 6). With the middle wing sections 16A and 16B in the folded state, each inner wing section 14A and 14B is then folded laterally inward and over the center frame section 12 (FIGS. 7 and 8). To unfold the field cultivator 10 and transform back to the field or operating position shown in FIGS. 1 and 2, the folding sequence described above is simply reversed.

The outer wing sections 18, middle wing sections 16 and inner wing sections 14 are stacked together in a vertically arranged stack over the center frame section 12 when in the folded state. To allow this type of nested stacking configuration, each of the wing sections 14, 16 and 18 have a pivot axis 38, 40 and 42, respectively, which is vertically offset to allow the wing sections to lie flat against the laterally inward shank frame 20 when in the folded state. The middle wing sections 16 have a pivot axis 40 that is vertically higher than pivot axes 38 and 42 of adjacent wing sections 14 and 18, when in the unfolded state.

Different countries and states have different regulatory highway requirements concerning oversized vehicles on the road. In the US, some states exempt agricultural equipment from such regulations, while others require that any type of vehicle on a road must comply with the oversized vehicle regulations. In Europe, the regulations may be more strict concerning the height and width of vehicles which may travel on a road without being accompanied by an escort vehicle. With the triple-fold field cultivator 10 of the present invention, the overall frontal profile dimensions when in the folded state fit within regulatory requirements for both the US and Europe. More particularly, with all of the wing sections 14, 16 and 18 in the folded state, the field cultivator 10 is then in a transport position with an overall frontal profile having dimensions with a maximum width "W" of no greater than approximately 20 feet, preferably approximately 18 feet wide, and a height "H" of no greater than approximately 14 feet, preferably approximately 13 feet, 6 inches high (FIG. 8).

These maximum frontal profile dimensions include all of the shank frames 20, shanks 30, rear gauge wheels 34 and front gauge wheels 36, when in the folded state. Rear gauge wheels 34 run on tilled soil and are referred to as tilled gauge wheel assemblies 34 herein. Front gauge wheels 36 run on untilled soil and are referred to as untilled gauge wheel assemblies 36 herein. The rear auxiliary implements 22 are considered to be add-ons to the main field cultivator 10, and may be outside these overall frontal profile dimensions, at least if not folded upwardly for the transport position. However, it is the intention that all of field cultivator 10, including the rear auxiliary implements 22, be within these maximum frontal profile dimensions when in the transport position.

Figure 9:
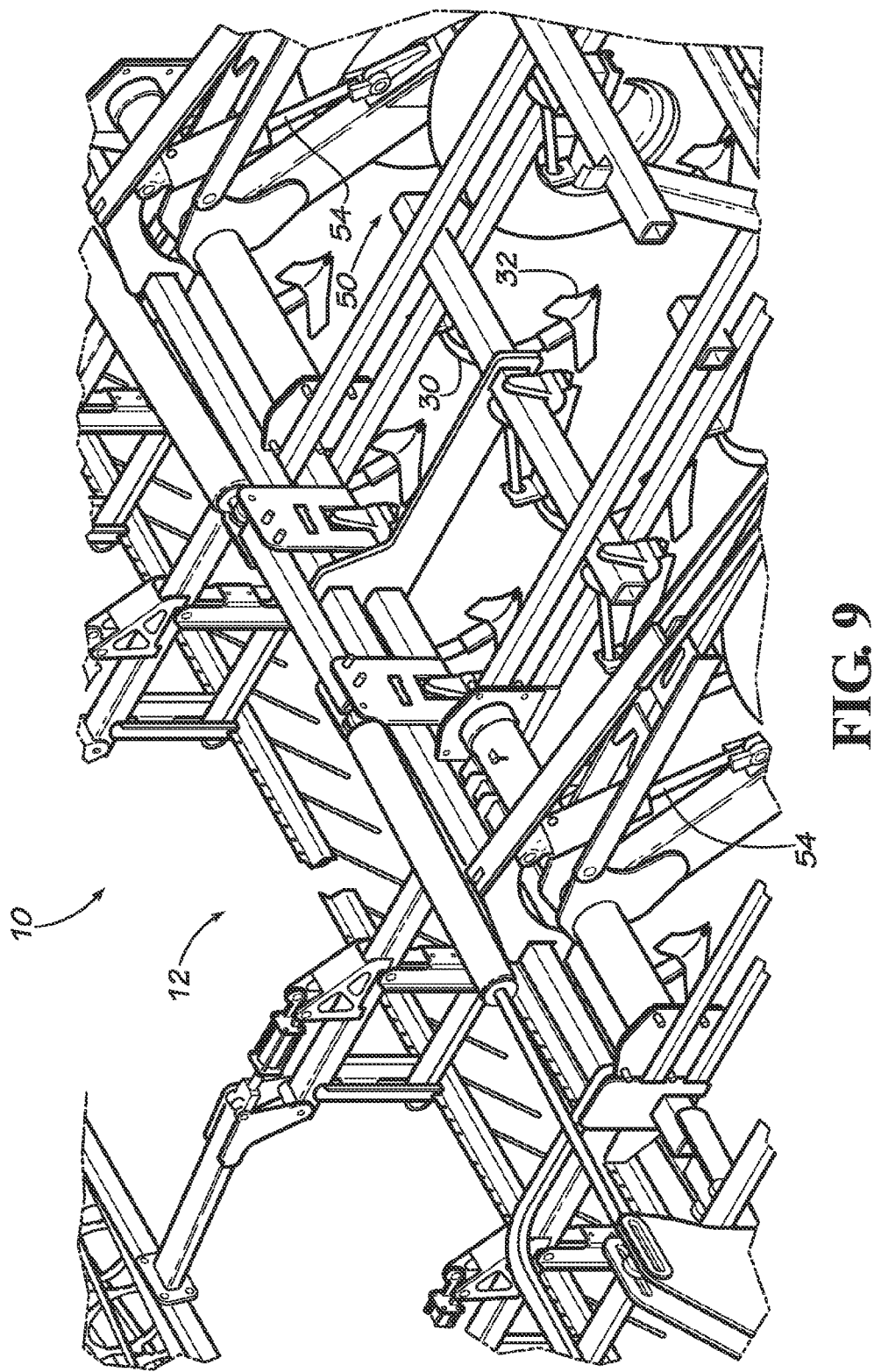
FIG. 9 is a perspective view of part of the main frame section of the field cultivator of FIGS. 1-8.
Figure 10:
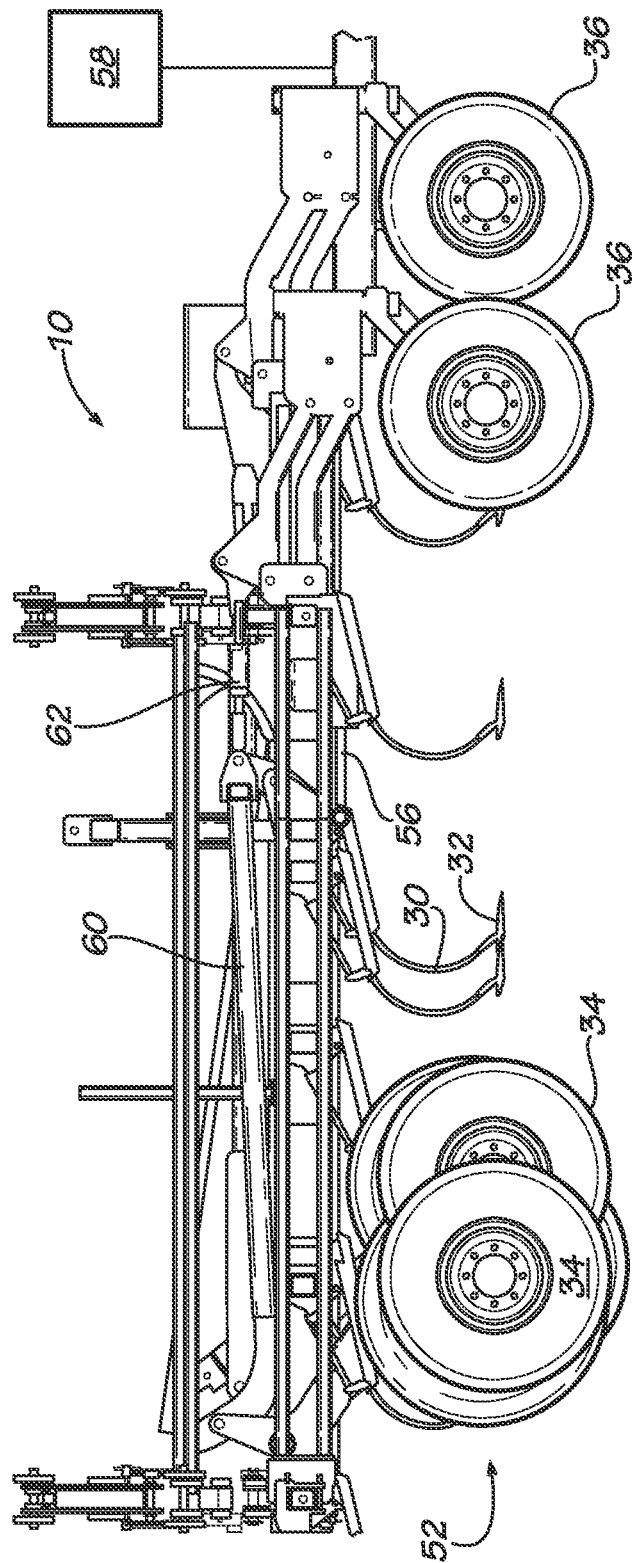
FIG. 10 is a side view of the field cultivator of FIGS. 1-9, with a primary focus on a wing section.

Now, additionally referring to FIGS. 9 and 10 there is shown further details of implement 10. Main section 12 is shown in FIG. 9 with gauge wheel system 50 having actuators 54, which provide depth level control for main section 12 when implement 10 is in field mode and support for the folded implement 10 while in transport mode.

A typical gauge wheel system 52 is shown for one of the wing sections 14, 16 and 18 in FIG. 10. Gauge wheel systems 52 include actuators 56, a linkage system 60 and an adjustable link 62. A controller 58 (shown abstractly in the figures) orchestrates the movement of gauge wheel systems 50 and 52 in field and transport modes and during the transition to/from the field and transport modes.

Gauge wheel system 50 are shown having actuator 54 coupled more directly to the rear wheels and a linkage system is used to move the wheels that are to the fore of the rear wheels. Gauge wheel systems 52 have actuator 56 positioned between tilled gauge wheel assemblies 34 and untilled gauge wheel assemblies 36 with linkage system 60 coupling wheel assemblies 34 and 36 for coordinated movement. Adjustable link 62 allows for an independent manual fore/aft leveling adjustment of each section. Actuator 56 is directly linked to tilled gauge wheel assembly 34 and is indirectly linked, through adjustable link 62, to untilled gauge wheel assembly 36.

Actuators 54 and 56, are under the independent and individual control of controller 58 so that sections 12-18 can each be individually adjusted for depth control of shovels 32 (which are tillage elements 32) of each section in a manner substantially independent of the other sections while in the field mode of operation. As implement 10 is transitioned from the field mode to the transport mode and the sections are being folded together, controller 58 causes gauge wheel systems 52 to go from the fully extended position, as shown in FIG. 10 with actuator 56 extended, to being partially retracted as seen in the folded wing sections of FIG. 6. This effectively lowers the profile of each wing section 14-18 as the particular wing section is folded. While controller 58 may be a set of valves manually controlled by an operator, it is contemplated that controller 58 would be an electronic control system that controls the sequence of lowering the profile of each wing section, as it is being folded by the actuators used for the purpose of folding wing sections 14-18.

The present invention advantageously independently controls the fore/aft orientation relative to the position of tilled gauge wheel assemblies 34 and untilled gauge wheel assemblies 36, as well as the depth of the tilling elements while implement 10 is in the field mode. The characteristics of the tilled and untilled soil are taken into consideration as adjustable link 62 is adjusted. Some characteristics of the soil are the compressibility and the relative heights of the tilled and untilled soil. Also, the effect that the fore/aft weight distribution of implement 10 between tilled gauge wheel assemblies 34 and untilled gauge wheel assemblies 36 has upon the soil characteristics can also be compensated for by the adjustment of adjustable link 62.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a frame, including
      a main section including a pull hitch extending in a travel direction;
      a plurality of foldable wing sections coupled to the main section, at least one of the plurality of foldable wing sections coupled on a left side of the main section and at least one other of the plurality of foldable wing sections coupled on a right side of the main section; and
      a plurality of ground engaging tilling elements individually coupled to the main section and to each of the plurality of foldable wing sections;
   an adjustment wheel system including
      a first wheel system carried by said main section and including a plurality of actuators, each of the plurality of actuators operably coupled to each rear wheel of the main section to adjust height of each rear wheel of said main section; and
      a second wheel system carried by each wing section and configured to adjust wheels that are forward of rear wheels of each respective wing section, the second wheel system comprising an actuator and a linkage system positioned on each wing section and operably coupled to and positioned between an untilled wheel assembly and a tilled wheel assembly of the respective wing section, each second wheel system configured to coordinate movement of the untilled wheel assembly and the tilled wheel assembly;
   wherein the adjustment wheel system is configured to adjust the untilled wheel assembly relative to the tilled wheel assembly of the second wheel system to compensate for a height difference between tilled and untilled soil, and to adjust the rear wheels of the first wheel system relative to the adjustment of the second wheel system when the agricultural tillage implement is in a field mode.

2. The agricultural tillage implement of claim 1, further comprising a control system configured to actuate the actuators of the first wheel system to control a height of the rear wheels and depth of tilling elements, and to actuate the actuators of the second wheel system to control a depth of the tilling elements in each of the wing sections when the implement is in a field mode.

3. The agricultural tillage implement of claim 1, wherein each actuator of each wing section of the second wheel system is configured to move both the untilled wheel assembly and the tilled wheel assembly in a coordinated manner.

4. The agricultural tillage implement of claim 1, wherein each actuator of each wing section of the second wheel system is directly coupled to the tilled wheel assembly, the actuator being coupled through the linkage assembly to the untilled wheel assembly.

5. The agricultural tillage implement of claim 2, wherein each of the actuators of the adjustment wheel system is independently extendable and retractable.

6. The agricultural tillage implement of claim 2, wherein the actuators of the adjustment wheel system are positionable to level the implement from side-to-side when the implement is in the field mode.

7. The agricultural tillage implement of claim 6, wherein the actuators of the second wheel assembly are configured to assist in moving the wing sections from a transport mode to the field mode.

8. An adjustment wheel system for an agricultural tillage implement, the implement having a frame, a main section including a pull hitch extending in a travel direction, a plurality of foldable wing sections coupled to the main section, and a plurality of ground engaging tilling elements individually coupled to one of the main section and to each of the plurality of foldable wing sections, the adjustment wheel system including:
   a first wheel system carried by the main section and including a plurality of actuators, each of the plurality of actuators operably coupled to each rear wheel of the main section to adjust height of each rear wheel of the main section; and a second wheel system carried by each wing section and configured to adjust wheels that are forward of rear wheels of the respective wing section, the second wheel system comprising an actuator and a linkage system positioned on each wing section and operably coupled to and positioned between an untilled wheel assembly and a tilled wheel assembly of its respective wing section, each second wheel system configured to coordinate movement of the untilled wheel assembly and the tilled wheel assembly, wherein the adjustment wheel system is configured to adjust the untilled wheel assembly relative to the tilled wheel assembly of the second wheel system to compensate for a height difference between tilled and untilled soil, and to adjust the rear wheels of the first wheel system relative to the adjustment of the second wheel system when the agricultural tillage implement is in a field mode.

9. The adjustment wheel system of claim 8, further comprising a control system configured to actuate the actuators of the first wheel system to control a height of rear wheels and depth of tilling elements, and to actuate the actuators of the second wheel system to control a depth of the tilling elements in each of the wing sections when the agricultural tillage implement is in the field mode.

10. The adjustment wheel system of claim 8, wherein each actuator of each wing section of the second wheel system is configured to move both the untilled wheel assembly and the tilled wheel assembly in a coordinated manner.

11. The adjustment wheel system of claim 8, wherein each actuator of each wing section of the second wheel system is directly coupled to the tilled wheel assembly, the actuator being coupled through the linkage assembly to the untilled wheel assembly.

12. The adjustment wheel system of claim 9, wherein each of the actuators of the adjustment wheel system is independently extendable and retractable.

13. The adjustment wheel system of claim 12, wherein the actuators are positionable to level the implement from side-to-side when the implement is in the field mode.

14. The adjustment wheel system of claim 13, wherein the actuators of the second wheel assembly are configured to assist in moving the wing sections from a transport mode to the field mode.

* * * * *